United States Patent
Ran et al.

(10) Patent No.: US 11,424,901 B2
(45) Date of Patent: Aug. 23, 2022

(54) METHOD AND APPARATUS FOR SYNCHRONOUS SIGNALING BETWEEN LINK PARTNERS IN A HIGH-SPEED INTERCONNECT

(71) Applicant: Intel Corporation, Santa Clara, CA (US)

(72) Inventors: Adee Ofir Ran, Maayan Baruch (IL); Kent C. Lusted, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 16/655,834

(22) Filed: Oct. 17, 2019

(65) Prior Publication Data
US 2020/0052872 A1    Feb. 13, 2020

Related U.S. Application Data

(60) Provisional application No. 62/749,447, filed on Oct. 23, 2018.

(51) Int. Cl.
*H04L 7/00* (2006.01)

(52) U.S. Cl.
CPC .................. *H04L 7/0012* (2013.01)

(58) Field of Classification Search
CPC ....... H04L 7/0012; H04L 7/10; H04L 7/0337; H04L 12/40; H04L 12/42; H04L 12/437; H04J 3/0641; H04J 3/0658; Y02D 30/00
See application file for complete search history.

(56) References Cited

U.S. PATENT DOCUMENTS

| | | | | |
|---|---|---|---|---|
| 7,873,073 | B2* | 1/2011 | Frlan | H04L 12/2885 370/466 |
| 8,537,858 | B2* | 9/2013 | Diab | H04J 3/0641 370/469 |
| 8,565,270 | B2* | 10/2013 | Wang | H04J 3/0688 370/516 |
| 8,705,596 | B2* | 4/2014 | Diab | H04L 43/50 375/224 |
| 8,706,042 | B2* | 4/2014 | Takatori | H04L 5/1423 455/63.1 |
| 9,215,092 | B2* | 12/2015 | Lin | H04J 3/0641 |
| 9,735,905 | B2* | 8/2017 | Wang | H04J 3/0697 |
| 9,755,774 | B1* | 9/2017 | Reddy | H04L 12/403 |

(Continued)

OTHER PUBLICATIONS

IEEE Std 802.3azTM, Part 3: Carrier Sense Multiple Access with Collision Dection (CSMA/CD) Access Method and Physical Layer Specification, Amendment 5: Media Access Control Parameters, Physical Layers, and Management Parameters for Energy-Efficient Ethernet, IEEE, 302 pages, Oct. 27, 2010.*

(Continued)

*Primary Examiner* — Frank Duong
(74) *Attorney, Agent, or Firm* — Compass IP Law PC (57) ABSTRACT

Loop timing is performed in a Reconciliation Sublayer (RS) so that the transmit clock frequency can be adjusted to be equal to the receive clock frequency for the entire PHY (including the physical coding sublayer (PCS)). One of two partners is selected to be the timing Slave to the other. If only one partner is capable of loop timing, that partner becomes the Slave. If both partners are capable of loop timing, symmetry breaking can be used to determine which partner should become Slave.

24 Claims, 6 Drawing Sheets

(56) References Cited

U.S. PATENT DOCUMENTS

| | | |
|---|---|---|
| 2011/0170645 A1* | 7/2011 | Barnette ............... H04L 12/437 375/376 |
| 2013/0343400 A1 | 12/2013 | Lusted et al. |
| 2014/0254640 A1 | 9/2014 | Lusted et al. |

OTHER PUBLICATIONS

Itu-T G.8023, Series G: Transmission Systems and Media, Digital Systems and Networks Packet over Transport aspects—Ethernet over Transport aspects, Telecommunication Standardization Sector of ITU, 56 pages, Nov. 2018.*

Aweya et al., Implementing Synchronous Ethernet in Telecommunication Systems, IEEE, 34 pages, 2014.*

\* cited by examiner

| Octet number | Field name | Value/information |
|---|---|---|
| 1-3 | IEEE 802.3 OUI | 00-12-0F |
| 4 | IEEE 802.3 subtype | Available value, for example, 11 |
| 5 | Loop timing request/response and nonce | Bits 7:6: message type<br>  00 – respond with acknowledge<br>  01 – respond with denial<br>  10 – request to become SLAVE<br>  11 – request partner to be SLAVE<br>Bits 5:0: Request/response nonce |

METHOD AND APPARATUS FOR SYNCHRONOUS SIGNALING BETWEEN LINK PARTNERS IN A HIGH-SPEED INTERCONNECT

RELATED APPLICATIONS

The present application claims the benefit of a priority date of U.S. provisional patent application Ser. No. 62/749,447, filed Oct. 23, 2018, the entire disclosure of which is incorporated herein by reference.

BACKGROUND

Ethernet is a computer networking technology used in area networks. The Ethernet protocol is basically a plesiochronous system. A transmitter and receiver operate plesiosynchronously if they operate at the same nominal frequency but have a slight frequency mismatch. Differences in transmit and receive clock frequencies are compensated by insertion or deletion of idle characters. This does not require a master clock and enables symmetric point-to-point connections.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

Even within a plesiochronous system, creating a synchronicity at the physical level (such that transmit and receive signaling use exactly the same frequency) can be desirable, as it enables advanced signal processing techniques such as crosstalk cancellation. Synchronous signaling typically involves using one clock signal as a reference to another clock signal. Ethernet operation over some media such as twisted-pair (BASE-T) can use synchronous signaling due to the advanced signal processing required for full-duplex operation.

A link between two Ethernet over twisted-pair stations (for example, 1000BASE-T, 100BASE-T1, 1000BASE-T1, MultiGBASE-T) has a Master/Slave configuration. The Master/Slave relationship is determined before the link is established, either using an auto-negotiation protocol, as described in Institute of Electrical and Electronics Engineers (IEEE) Standard 802.3-2015, clause 28 or clause 98, or by "management" (manual or hard-wired setting), for example, in single-pair 100 Megabits per second (Mbps) Ethernet, in IEEE Standard 802.3-2015, clause 96.

In loop timing mode, both stations are in loop timing mode: one station is a master and the other station is a slave. The master station transmits signals on the medium (also referred to as wire) using the master station's local clock. The slave station receives the signal transmitted by the master station, extracts a clock which has the frequency of the master station's transmit clock and uses the extracted clock to transmit signals on the medium. As a result, both Master and Slave have the same frequency in transmit and receive directions, and the signaling is synchronous.

In a Synchronous Ethernet (for example, International Telecommunication Union Telecommunication Standardization Sector (ITU-T) G.8261/Y.1361 Annex A and ITU-T G.8262/Y.1362) network, transmitters use the same signaling frequency, which can be forwarded from a receiver to a transmitter either in the same link or in another link. The clocking configuration is typically predetermined for each device using manual settings.

However, not all PHYs (for example, optical PHYs) support auto-negotiation signaling. A PHY typically includes a physical medium attachment (PMA) sublayer, a forward error correction (FEC) sublayer and a physical coding sublayer (PCS). In an embodiment, instead of using auto-negotiation signaling, loop timing is performed in a Reconciliation Sublayer (RS) so that the transmit clock frequency can be adjusted to be equal to the receive clock frequency for the all sublayers of the PHY. One of two partners is selected to be the timing Slave to the other. If only one partner is capable of loop timing, that partner becomes the Slave. If both partners are capable of loop timing, symmetry breaking can be used to determine which partner should become Slave.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
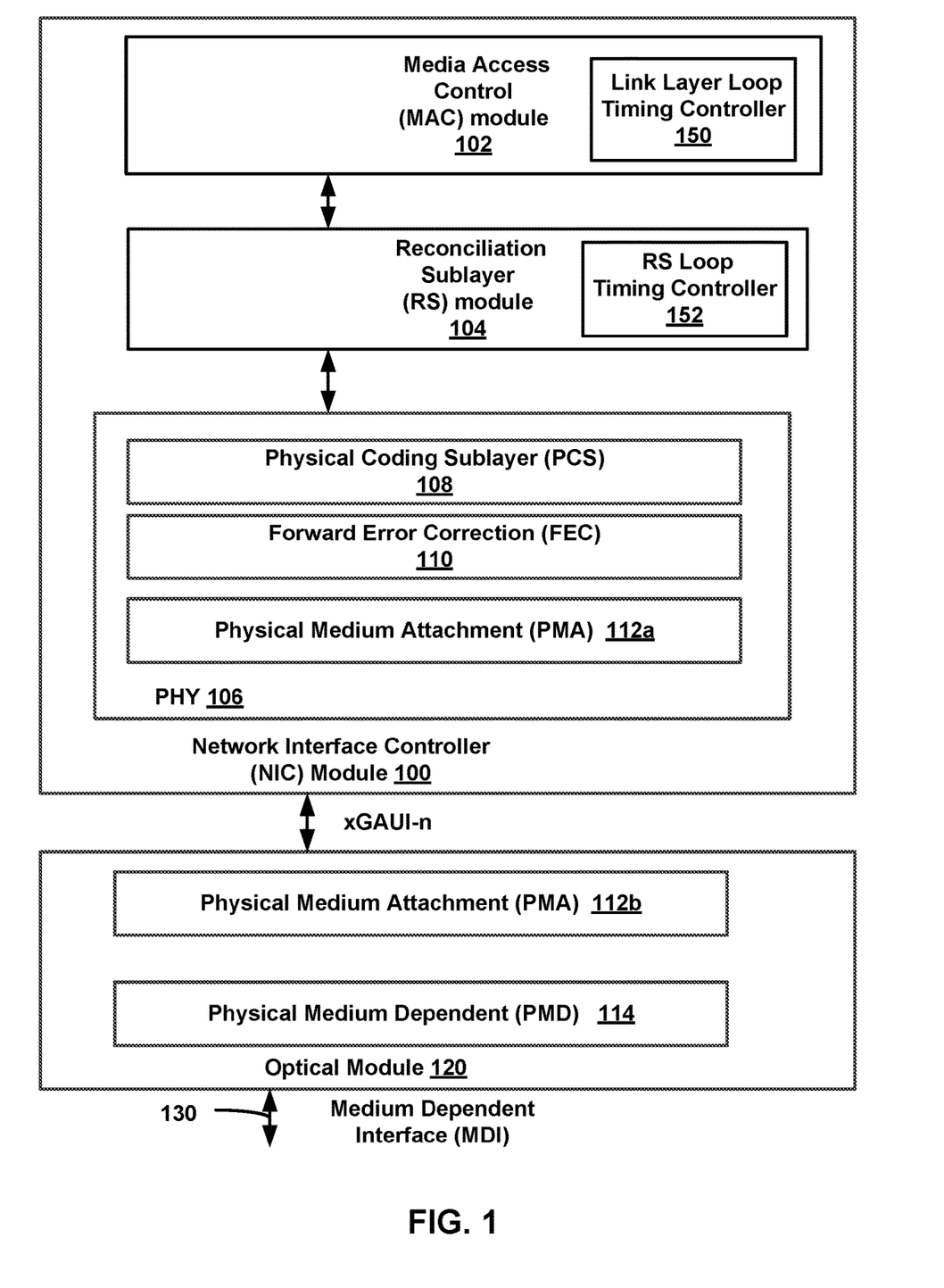
FIG. 1 is a block diagram illustrating Ethernet port circuitry in a network interface controller.

FIG. 1 is a block diagram illustrating Ethernet port circuitry in a network interface controller 100. The Ethernet port circuitry includes a Media Access Control (MAC) module 102, a reconciliation sublayer module 104 and a PHY module 106. The FEY module 106 includes, a physical medium attachment (PMA) sublayer module 112a, a forward error correction (FEC) module 110 and a physical coding sublayer (PCS) module 108.

The MAC module 102 is configured to transfer data to and from the PHY module 106. The Reconciliation Sublayer (RS) module 104 is a mapping function that reconciles the signals at a Media Independent Interface (MII) to the Media Access Control (MAC)-Physical Signaling Sublayer (PLS) service definitions. MAC module 102 is configured to implement aspects of the MAC layer operations and the RS module 104 is configured to implement reconciliation sublayer operations.

The network interface controller 100 is communicatively coupled via a xGAUI-n (a high data rate serial link) electrical connection to an optical module 120. The electrical connection can have n lanes and the data rate per lane can be 100 Gbps or greater. The optical module 120 includes Physical Layer (PHY) circuitry that includes a physical medium dependent (PMI)) sublayer module 114 and a physical medium attachment (PMA) sublayer module 112b.

The Physical Medium Dependent (PMD) sublayer 114 is located just above the Medium Dependent Interface (MDI) 130 and is responsible for interfacing to the transmission medium. The Physical Medium Attachment (PMA) sublayer 112b contains functions for transmission, reception, and collision detection, clock recovery and skew alignment. The PMD 114 and PMA 112b are configured to transmit and receive serial data over the MDI 130.

The FEC module 110 can decode data passed from the PMD 114 and PMA 112a, 112b to the PCS module 108 and encode data passed from the PCS module 108 to the PMD 114 and PMA 112a, 112b. The forward error correction code can improve the reliability of data transmission at higher line speeds.

In the transmit direction, the MAC module 102 receives data to be transmitted in a MAC frame over the MDI 130, and generates the MAC frame that includes inter-packet gap (IPG), preamble, start of frame delimiter (SFD), padding, and Cyclic Redundancy Check (CRC) bits in addition to the received data before passing the MAC frame to the PHY module 106 over a data bus. The PHY module 106 encodes the MAC frame as required for reliable serial transmission over the MDI 130.

In the receive direction, the MAC module 102 receives MAC frames over a data bus from the PHY module 106. The MAC module 102 accepts MAC frames from the PHY, performs Ethernet frame detection and validation, cyclic redundancy check (CRC) validation, updates statistics counters, strips out the CRC, preamble, and SFD, and forwards the rest of the MAC frame that includes headers for other protocols to a next layer (for example, the Internet protocol (IP) layer).

Between each received Ethernet frame there are two bytes of Interframe gap and eight bytes of preamble. The eight byte preamble consists of a 56-bit (seven-byte) pattern of alternating 1 and 0 bits, providing bit-level synchronization and a one-byte start frame delimiter (SFD). The SFD indicates the beginning of the Ethernet frame.

Loop timing can be performed in Reconciliation Sublayer (RS) loop timing circuitry 152 in the Reconciliation Sublayer (RS) 104 or Link Layer loop timing circuitry 150 in the MAC module 102 so that the transmit clock frequency can be adjusted to be the same as the receive clock frequency for the whole PHY (including the physical coding sublayer (PCS)). One of two link partners is selected to be the timing Slave to the other.

Figure 2:
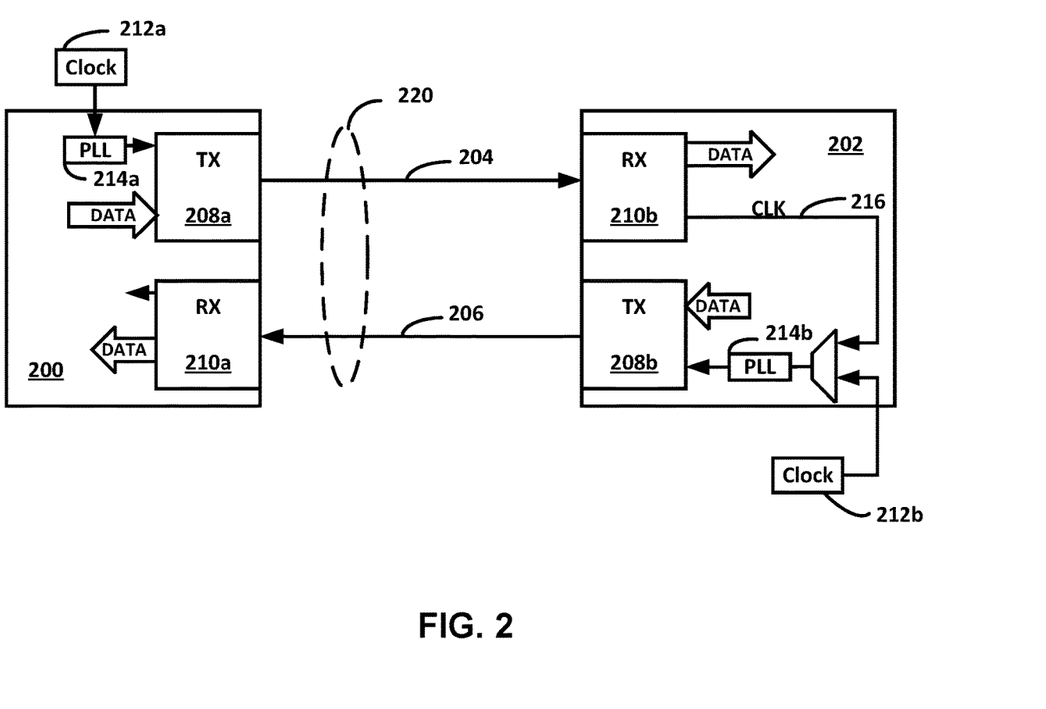
FIG. 2 illustrates loop timing between two networking devices that communicate over a link.

FIG. 2 illustrates loop timing between two networking devices that communicate over a bidirectional link 220. In another embodiment, a single full duplex link could be used. Each networking device (for example, a system, an Ethernet hub, or an Ethernet switch) can be referred to as a link partner. Link partners 200, 202 communicate over two unidirectional serial links 204, 206 that form bidirectional link 220. One of the link partners 200, 202 can be referred to as a master link partner and the other can be referred to as a slave link partner. Each link partner 200, 202 includes a respective transmitter 208a, 208b a receiver 210a, 210b, a clock 212a, 212b and a phase locked loop (PLL) 214a, 214b. In the example shown, link partner 202 acts as a timing Slave and sets the frequency of transmit clock to be equal to that of a recovered receive clock 216. In an embodiment, the PLL 214b that generates the transmit clock can use a divided version of the recovered receive clock 216 as a reference clock. In an embodiment, First In First Out (FIFO) buffers with different clock domains can be used to control the data flow into the transmitter 208b so that the data sent from 208b is clock synchronous with the data received by 210b.

Loop timing which can also be referred to as a loop timing synchronization scheme or method can be performed in several locations, for example, within the Reconciliation Sublayer (RS) module 104, in the PCS 108 or in the PMA sublayer 112a (which typically includes the optical Clock and Data Recovery circuit (CDR)), or in the MAC module 102 such that data transmitted and received over the bidirectional link 220 have the same frequency.

All of the devices accessible via the Ethernet link may not be capable of performing loop timing. However, to enable synchronous signaling over the bidirectional link 220, one of the two link partners 200, 202 must be capable of performing loop timing. Also, two devices that are each capable of performing loop timing can operate as link partners. If both devices are capable of performing loop timing, only one device can activate loop timing at a time to avoid a slave symmetry situation where both devices activate loop timing.

Prior to activating loop timing on a link between two devices (link partners 200, 202), neither of the link partners 200, 202 knows whether the other link partner is loop-timing-capable because the link has not been preconfigured with loop timing. A device that includes loop timing capability can determine via Reconciliation Sublayer module 104 if it has a link partner.

The operation of the Reconciliation Sublayer module 104 is described in clause 46 of IEEE Std 802.3-2015. A bi-directional link is established using sequence ordered sets that are described in the IEEE 802.3. The sequence ordered sets include local fault and remote fault ordered sets.

To establish a link, the local Reconciliation Sublayer module 104 listens to the incoming data stream received from the PHY 106. If the bidirectional link 220 is up, the incoming data stream can include incoming traffic. If the receiver is functional but the link partner indicates a fault, the incoming data stream includes a sequence of remote fault ordered sets. If no valid signal is detected, or any other fault is reported by the PHY 106, the incoming stream includes a sequence of local fault ordered sets.

When a local fault is received, the Reconciliation Sublayer module 104 sends remote fault ordered sets to the transmitter towards the link partner. When a remote fault is received, the Reconciliation Sublayer module 104 sends an idle sequence to the transmitter. When either idle or normal incoming traffic is received, the Reconciliation Sublayer module 104 can send its outgoing traffic to the transmitter.

In an embodiment, loop timing can be initialized between a local device and a link partner through use of a loop timing ordered set. Transmission of a loop timing ordered set can be similar to the remote fault ordered set that is described in clause 46 of IEEE Std 802.3-2015. The loop timing ordered set can include an indication that the transmitting device has activated loop timing.

Figure 3:
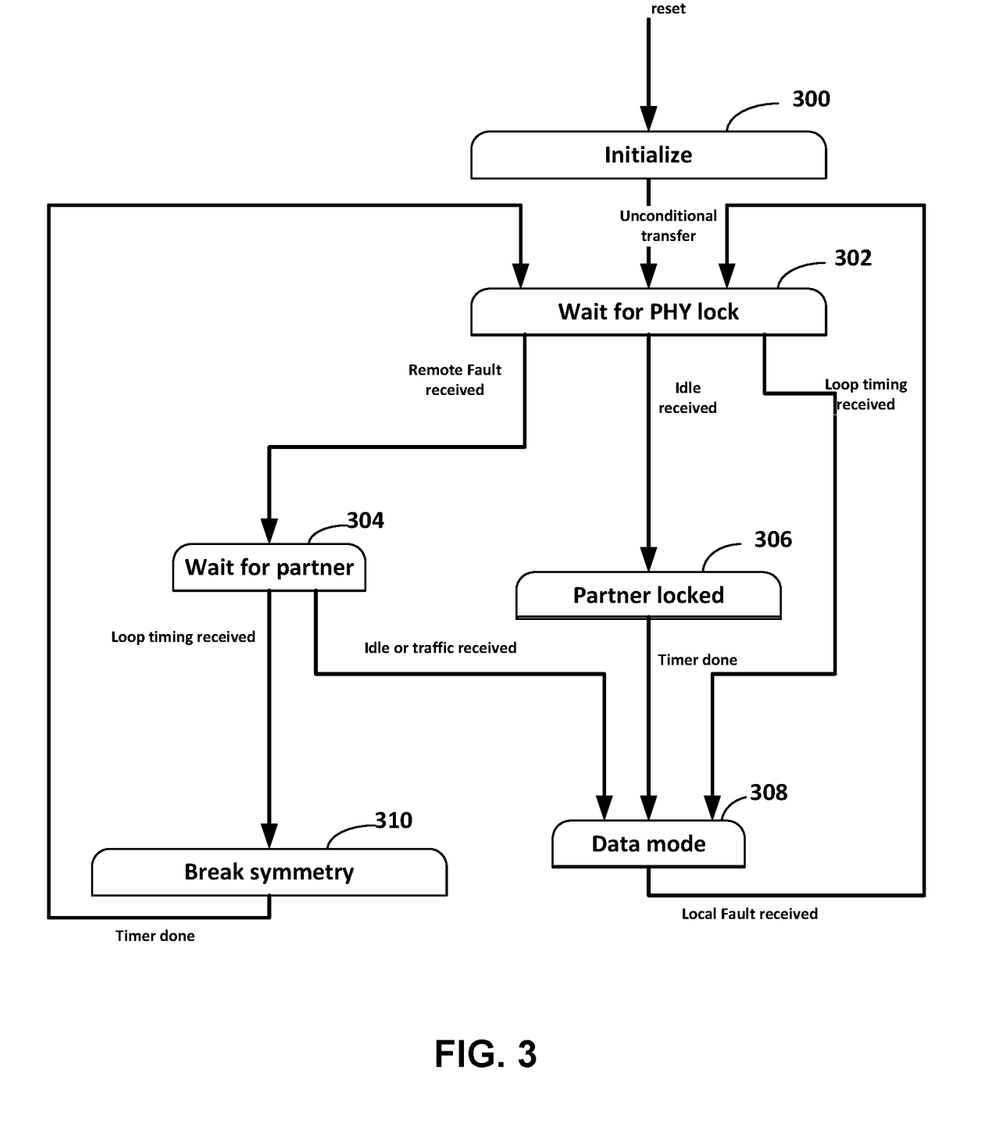
FIG. 3 is a flowgraph illustrating the use of a loop timing ordered set to perform loop timing in the Reconciliation Sublayer loop timing module to adjust a transmit clock frequency to be equal to a receive clock frequency.

FIG. 3 is a flowgraph illustrating the use of a loop ordered set to perform loop timing in the Reconciliation Sublayer loop timing controller 152 (FIG. 1). The Reconciliation Sublayer loop timing controller is configured to receive a recovered receive clock and to adjust a transmit clock frequency to be equal to a receive clock frequency. The flowgraph will be described for establishing a link between a local device 200 and a link partner 202.

At block 300, the link between the local device 200 and link partner 202 is initialized and loop timing is disabled. Processing continues with block 302.

At block 302, if the local device 200, upon locking its receiver 210a to the data pattern, detects a remote fault incoming sequence, the link partner 202 has not received a valid signal, local device 200 is the first to lock, processing continues with block 304.

If the local device 200, upon locking its receiver to the data pattern, detects an idle incoming sequence, the link partner 200 was the first to lock. However, the incoming sequence is idle instead of loop timing because the link partner 200 may not be capable of loop timing or can be configured not to use loop timing. Processing continues with block 306.

If the local device 200, upon locking its receiver to the data pattern, detects a loop timing incoming sequence, the link partner 202 is already locked. Link partner 202 was the first to lock and link partner 202 performs the loop timing. Processing continues with block 308.

At block 304, local device 200 activates loop timing and generates a sequence of loop timing ordered sets instead of idle sequence. When link partner 202 locks its receiver and recovers this data, link partner 202 switches from remote fault to idle or any outgoing traffic, because the loop timing ordered set is not a fault. Link partner 202 does not have to be aware of the loop timing ordered set's functionality, and therefore link partner 202 may not support loop timing. When local device 200 detects idle received from the link partner 202, local device 200 switches to sending idle or outgoing traffic, and the link is then successfully established in a loop timed mode with link partner 202 as the master and local device 200 as the slave. Processing continues with block 308.

If both link partners 200, 202 lock their receiver at almost the same time, for example, up to the propagation delay of the link, a slave symmetry can occur. Slave symmetry is detectable by each link partner 200, 202 because loop timing ordered sets are both transmitted and received by each link partner 200, 202. If slave symmetry is detected, processing continues with block 310.

At block 306, local device 200 can safely activate loop timing but local partner 200 can continue transmission of remote fault for a time period to allow link partner 202 to attempt to recover from activation of loop timing which can have a transient effect on signal frequency and phase. The time period can be referred to as a hold time. The hold time can be a few milli seconds (ms) or one second. After the hold time, local device 200 can transmit idle or outgoing traffic, and the link is successfully established in a loop timed mode with link partner 202 as the master and local device 200 as the slave.

At block 308, local device 200 is the master and link partner 202 is the slave. Local device (A) 200 switches to transmitting idle or outgoing traffic, which indicates to link partner 202 that local device 200 is locked and receives a valid sequence. Link partner (B) 202 can switch to idle or outgoing traffic, and the link is successfully established in a loop timed mode with local device 200 as the master and link partner 202 as the slave.

At block 310, when both link partners 200, 202 detect slave symmetry, both link partners 200, 202 transmits remote fault for a randomized time chosen independently on each line partner, for example, the randomized time can be 1+x seconds where x can be a randomly chosen number between 0 and 0.1. Processing continues with block 302 to repeat the process discussed in conjunction with blocks 302, 304, 306 and 310) until one of the link partners 200, 202 is Master.

One benefit of using the Reconciliation Sublayer is that the loop timing decision and activation are performed before data is transmitted between the link partners 200, 202. The Signal to Noise Ratio (SNR) can be low because signal processing requiring loop timing is not yet possible and thus there can be high error rate. However, a sequence of ordered sets can be detected even when there is a high error rate.

In another embodiment, loop timing can be performed in a link layer. The Link-Layer Discovery Protocol (LLDP) specified in IEEE Std 802.3-2015 clause 79 uses physical layer frames (such as Ethernet frames). The information fields in each Link-Layer Discovery Protocol frame are contained in a Link Layer Discovery Protocol Data Unit (LLDPDU) as a sequence of short, variable length, information elements that each include a type, length, and value (TLV) field. Ethernet uses a number of Organizationally Specific TLVs for passing certain types of information, for example, MAC/PHY configuration status, maximum frame size and additional Ethernet capabilities that are specified in IEEE Std 802.3-2015 clause 79. Each type of information is assigned an IEEE 802.3 subtype, for example, maximum frame size is assigned a subtype of '4'. A subtype can be assigned to a loop timing control TLV to communicate handshake messages for loop timing.

Figure 4:
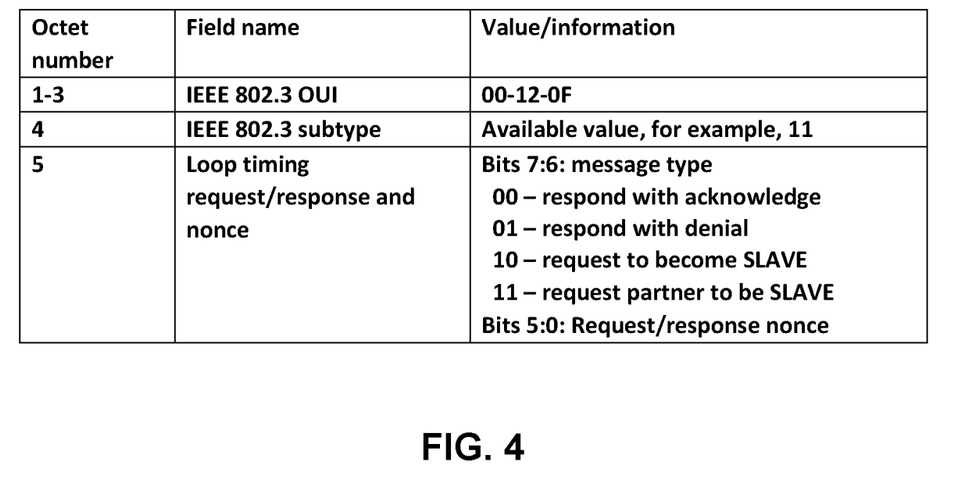
FIG. 4 illustrates a possible encoding of a loop timing message into a type, length, and value ("TLV") information string.

FIG. 4 illustrates a possible encoding of a loop timing message into a type, length, and value ('TLV") information string. The length of the TLV information string for the loop timing message can be 5 octets. The first 3 octets store the Organizationally Unique Identifier (OUI), a 24-bit unique number that identifies a manufacturer or other organization. For example, the OUI can be 00-12-0F. The fourth octet stores the subtype. The subtype for the loop timing control TLV can be any available value, for example, "11". The fifth octet is the loop timing request/response and nonce field. The bits in the fifth octet can be assigned as shown in FIG. 4, with Bits 7:6 to store the message type and Bits 5:0 to store a request/response nonce. Bit 7 set to '0' can indicate a response message and Bit 7 set to '1' can indicate a request message. The request message type encoded in Bits 7:6 can be a request sent to a link partner to either become a Slave or to have the link partner become a Slave. The response message type encoded in Bits 7:6 can be a denial of the request message or an acknowledge of the request message as shown in FIG. 4. In other embodiments other bits of octet 5 or other octets in the TSV can be used to encode request and response messages to perform loop timing control between two link partners 200, 202.

Figure 5:
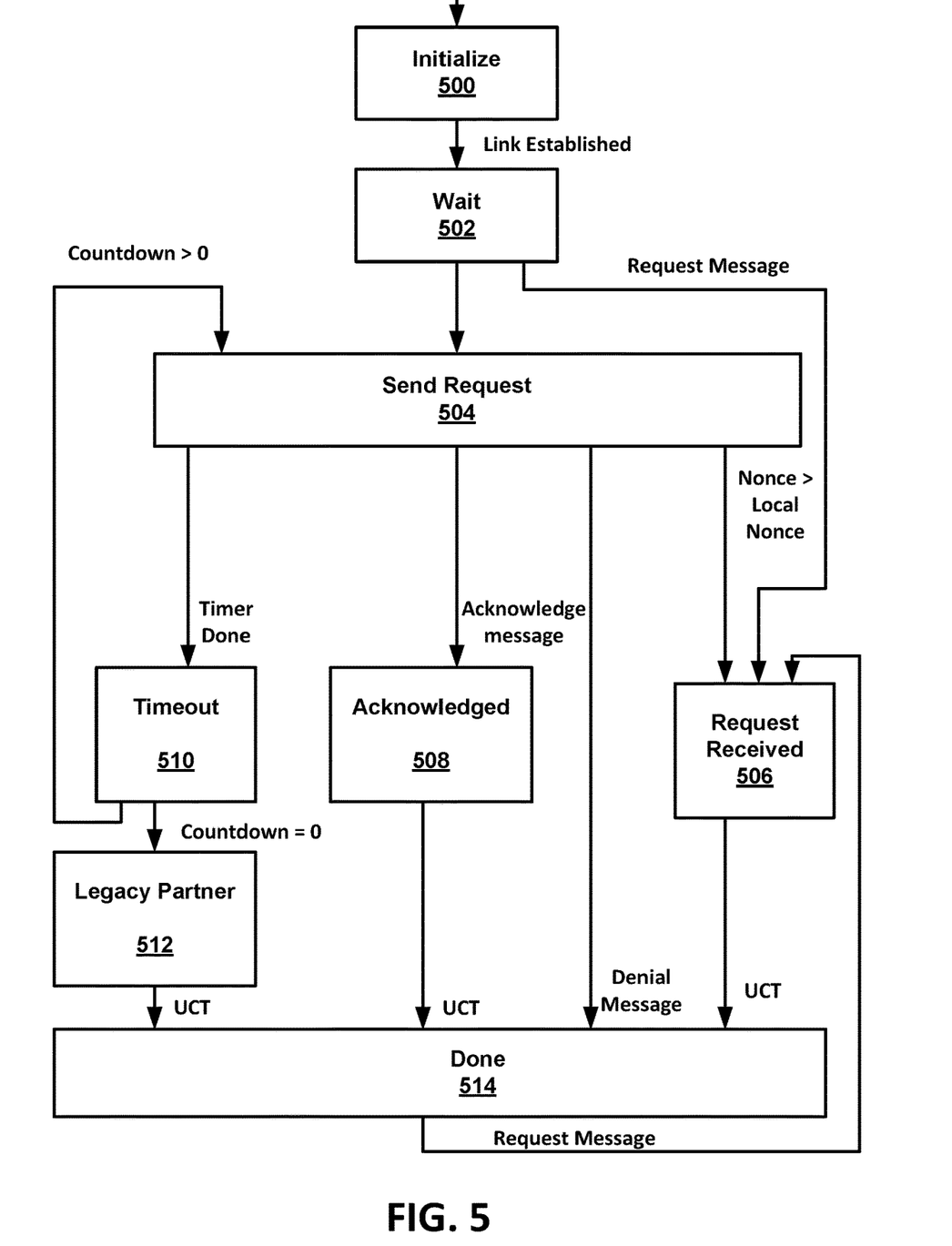
FIG. 5 is a flowgraph illustrating the use of loop timing messages to perform loop timing in the Link Layer loop timing logic in the Media Access Control module to adjust a transmit clock frequency to be equal to a receive clock frequency.

FIG. 5 is a flowgraph illustrating the use of loop timing messages (also referred to as loop timing handshake messages) to perform loop timing in the Link Layer loop timing circuitry 150 in the MAC module 102 to adjust a transmit frequency of a transmit clock to be equal to a receive clock frequency. The flowgraph will be described for establishing a link between a local device 200 and a link partner 202.

At block 500, a link is established between the link partners 200, 202. Processing continues with block 502.

At block 502, link initialization is performed. If local device 200 is capable of loop timing, processing continues with block 504 to request that loop timing be performed. If local device 200 receives a message from remote device 202, processing continues with block 506 to process the message.

At block 504, local device 200 can send an LLDP frame to remote device 202 the frame includes the loop timing control TLV, with message type bits set to indicate that the local device 200 is a timing Slave. Alternatively, local device 200 can set message type bits to request that remote device 202 be a timing Slave. The nonce bits in the LLDP frame are set to a randomly generated value. The local device 200 waits for a response to the message. If a response with message type bits set to denial (a denial message) is returned to the local device 200, loop timing is not enabled for the established link and processing is complete at block 514. If an acknowledge message is received, processing continues with block 508.

At block 506, upon receiving a request for loop timing, if remote device 202 supports the LLDP loop timing control, remote device 202 can send a response message with message type bits set to acknowledge or denial. The response message sent by the remote device 202 can optionally include the same nonce value as included in the received request to identify the request that is being acknowledged. If local device 200 and remote device 202 both send requests, the request with the higher nonce (interpreted as a 6-bit unsigned value) is considered valid by both the local device 200 and the remote device 202, and the request with the lower nonce is ignored by the local device 200 and the remote device 202. If both nonce values are the same, both requests are cancelled and local device 200 or remote device 202 can generate a new request at block 504 with a new randomly generated nonce. If a response to the request is not received within a selected time, processing continues with block 510.

At block 508, an acknowledge message has been received in response to the send request. If the local request is a local slave, loop timing is activated with the local partner 200 as Slave. If the local request is not local slave, loop timing is activated in the local partner 200 as Master. Processing is complete at block 514.

At block 510, the response was not received within a selected time, a counter is decremented and if the count value (countdown) is greater than zero, processing continues with block 504 to send the request again. A request can be sent multiple times several with the same nonce value and the same message type if the response is not received in a timely manner. Likewise, a response can be repeated several times if multiple requests are received. If the requestor does not receive a response after a number of repeated requests have been sent, processing continues with block 512.

At block 512, a response has not been received after the request has been sent multiple times, it is likely that the link partner does not support LLDP loop timing control. Loop timing can be activated by the local partner 200, with the local partner becoming a Slave. Processing is complete at block 514.

A request to set enable loop timing that can result in slave symmetry, for example, after another request has set loop timing in the other device should be denied. A device that activates loop timing (either the requestor or the responder if a request was acknowledged, or the requestor if it deduces that the link partner does not support LLDP loop timing control) can optionally do so while transmitting idle and keep transmitting idle for some period (e.g. a few milli seconds) after the switching, to allow the other device to possibly recover from activation of loop timing without losing data.

LLDP messaging discussed in conjunction with FIG. 4 and FIG. 5 performs loop timing control while the link is up, and thus requires the Bit Error Rate (BER) to be sufficient to enable LLDP messaging to perform the loop timing before the clocks have been synchronized.

In yet another embodiment, if the PHY in both Master and Slave supports auto-negotiation or link training, for example, BASE-T PHYs and backplane or copper cable assembly PHYs, messages similar to the ones described in conjunction with the embodiment for LLDP can be passed between the two link partners 200, 202 using bits in the Auto-Negotiation or link training frames. The method discussed in conjunction with FIG. 5 can be used to complete the synchronization of the link between the two link partners 200, 202.

In this embodiment, loop timing is controlled before the link is up. Reserved bits in the messages can be used for PHYs that do not support loop timing control in the Auto-Negotiation or link training frames.

An advantage to use of loop timing is to enable digital crosstalk cancellation in the receiver, which prevents degradation of signal to noise ratio (SNR) and provides margin for error-free operation with higher crosstalk levels. The resilience to crosstalk can be used to enable more flexible package and/or board design, and can decrease platform cost. In an embodiment, crosstalk cancellation is performed in the receiver by sending a copy of the transmitted data pattern (from local, adjacent transmitters) back into the receiver for subtraction from the received signal. The crosstalk cancellation can be either in the digital domain (through advanced signal processing algorithms) or in the analog domain (through feedback circuits).

Loop timing can be applied to Ethernet PHY types which do not include auto negotiation and does not require manual control or network management. Also, loop timing can be implemented on a link by only one of the link partners.

Figure 6:
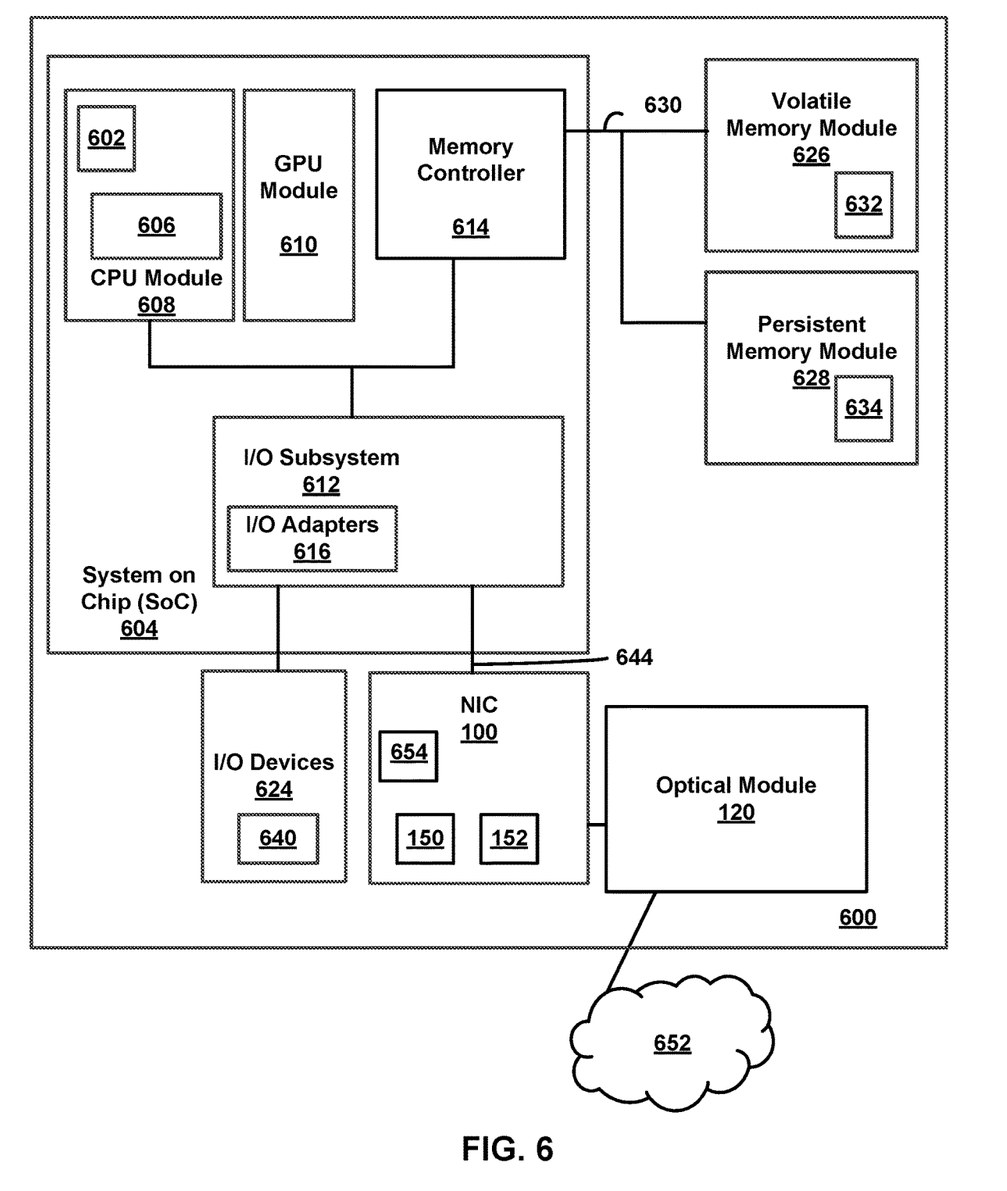
FIG. 6 is a block diagram of an embodiment of a computer system that includes loop timing for synchronous signaling between link partners in a high-speed Ethernet network.

FIG. 6 is a block diagram of an embodiment of a system 600 that includes loop timing for synchronous signaling between link partners in a high-speed Ethernet network 652. System 600 can correspond to a computing device including, but not limited to, a server, a workstation computer, a desktop computer, a laptop computer, and/or a tablet computer.

Loop timing can be performed in the Reconciliation Sublayer (RS) by RS loop timing controller 152 or in the MAC layer by Link Layer Timing Controller 150.

System 600 includes a system on chip (SOC or SoC) 604 which combines processor, graphics, memory, and Input/Output (I/O) control logic into one SoC package. The I/O adapters 616 can include a Peripheral Component Interconnect Express (PCIe) adapter that is communicatively coupled over bus 644 to a network interface controller 100. The network interface controller 100 can include a direct memory access (DMA) controller 654 that may also be referred to as a DMA engine. The DMA controller 654 can generate memory addresses and initiate memory read and write cycles to read and write data from/to the volatile memory 626 and/or the persistent memory module 628.

The SoC 604 includes at least one Central Processing Unit (CPU) module 608, a memory controller 614, and a Graphics Processor Unit (GPU) module 610. In other embodiments, the memory controller 614 can be external to the SoC 604. The CPU module 608 includes at least one processor core 602 and a level 2 (L2) cache 606.

Although not shown, the processor core 602 can internally include one or more instruction/data caches (L1 cache), execution units, prefetch buffers, instruction queues, branch address calculation units, instruction decoders, floating point units, retirement units, etc. The CPU module 608 can correspond to a single core or a multi-core general purpose processor, such as those provided by Intel® Corporation, according to one embodiment. In an embodiment the SoC 604 can be an Intel® Xeon® Scalable Processor (SP) or an Intel® Xeon® data center (D) SoC.

The memory controller 614 can be communicatively coupled via a memory bus 630 to a volatile memory module 626 that includes one or more volatile memory integrated circuits 632 and can also be communicatively coupled via the memory bus 630 to a persistent memory module 628 that includes one or more non-volatile memory integrated circuits 634. The volatile memory module 626 and persistent memory module 628 can be a dual-in-line memory module (DIMM) or a small outline dual in-line memory module (SO-DIMM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The Graphics Processor Unit (GPU) module 610 can include one or more GPU cores and a GPU cache which can store graphics related data for the GPU core. The GPU core can internally include one or more execution units and one or more instruction and data caches. Additionally, the Graphics Processor Unit (GPU) module 610 can contain other graphics logic units that are not shown in FIG. 1, such as one or more vertex processing units, rasterization units, media processing units, and codecs.

Within the I/O subsystem 612, one or more I/O adapter(s) 616 are present to translate a host communication protocol utilized within the processor core(s) 602 to a protocol compatible with particular I/O devices. Some of the protocols that I/O adapter(s) 616 can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 616 can communicate with external I/O devices 624 which can include, for example, user interface device(s) including a display and/or a touch-screen display 640, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

It is envisioned that aspects of the embodiments herein can be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities can typically employ large data centers with a multitude of servers.

Each blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board. These components can include the components discussed earlier in conjunction with FIG. 6.

Equalization coefficients selected for a communications link between blades can need to be modified after the communications link is established to handle variations in operating conditions, for example, temperature and humidity that can cause an increase in bit errors over the communications link.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In general, with respect to the descriptions herein, in one example an apparatus includes: port circuitry in a slave link partner, to communicate with a master link partner, the port circuitry including: a transmit clock having a transmit clock frequency; and a loop timing controller configured to receive a recovered receive clock from the master link partner and to initialize loop timing with the master link partner to adjust the transmit clock frequency so that a receive clock frequency of the recovered receive clock from the master link partner is equal to the transmit clock frequency.

In one example, the master link partner is selected to be a timing slave. In one example, the loop timing is initialized through use of a loop timing ordered set. In one example, the loop timing is initialized through use of a loop timing message in a Link-Layer Discovery Protocol frame. In one example, the loop timing is deactivated in the slave link partner upon detection that the master link partner is configured to perform the loop timing. In one example, the loop timing controller is in a Reconciliation Sublayer module and the transmit clock frequency is adjusted prior to transfer of data between the slave link partner and the master link partner. In one example, the loop timing controller is in a Media Access Control module. In one example, if the slave link partner is capable of loop timing, the slave link partner is designated a slave. In one example, if both the slave link partner and the master link partner are capable of loop timing, symmetry breaking to be performed to determine if the slave link partner or the master link partner is designated a Slave.

In general with respect to the descriptions herein, in one example a system includes: a slave link partner; port circuitry in the slave link partner, to communicate via a copper cable with a master link partner, the port circuitry including: a transmit clock having a transmit clock frequency; and a loop timing controller configured to receive a recovered receive clock from the master link partner and to initialize loop timing with the master link partner to adjust the transmit clock frequency so that a receive clock frequency of the recovered receive clock from the master link partner is equal to the transmit clock frequency.

In one example, the master link partner is selected to be a timing Slave. In one example, the loop timing is initialized through use of a loop timing ordered set. In one example, the loop timing is initialized through use of a loop timing message in a Link-Layer Discovery Protocol frame. In one example, the loop timing is deactivated in the slave link partner upon detection that the master link partner is configured to perform the loop timing. In one example, if the slave link partner is capable of the loop timing, the slave link partner is designated a slave. In one example, if both the slave link partner and the master link partner are capable of loop timing, symmetry breaking to be performed to determine if the slave link partner or the master link partner is designated a Slave.

In general with respect to the descriptions herein, in one example a method includes: communicating by port circuitry in a slave link partner with a master link partner; receiving a recovered receive clock from the master link partner; and initializing loop timing, by a loop timing controller, with the master link partner to adjust a transmit clock frequency so that a receive clock frequency of the recovered receive clock from the master link partner is equal to the transmit clock frequency.

In one example, the master link partner is selected to be a timing slave. In one example, the loop timing is initialized through use of a loop timing ordered set. In one example, the loop timing is initialized through use of a loop timing message in a Link-Layer Discovery Protocol frame. In one example, the loop timing is deactivated in the slave link partner upon detection that the master link partner is configured to perform the loop timing. In one example, if both the slave link partner and the master link partner are capable of the loop timing, symmetry breaking to be performed to determine if the slave link partner or the master link partner is designated a Slave. In one example, if the slave link partner is capable of the loop timing, the slave link partner is designated a slave.

In general, with respect to the descriptions herein, in one example a system includes: a memory module, the memory module comprising at least one volatile memory integrated circuit, the volatile memory integrated circuit to store a message; and port circuitry in a slave link partner, to send the message stored in the volatile memory integrated circuit to a master link partner, the port circuitry including: a transmit clock having a transmit clock frequency; and a loop timing controller configured to receive a recovered receive clock from the master link partner and to initialize loop timing with the master link partner to adjust the transmit clock frequency so that a receive clock frequency of the recovered receive clock from the master link partner is equal to the transmit clock frequency.

In general, with respect to the descriptions herein, in one example an apparatus includes: a transmit clock having a transmit clock frequency; and a loop timing controller configured to adjust the transmit clock frequency to be equal to a receive clock frequency of a recovered receive clock for a PHY.

In general, with respect to the descriptions herein, in one example a machine-readable medium for storing machine-executable instructions that, cause a system to: send, from a slave link partner, a Link-Layer Discovery Protocol (LLDP) frame to master link partner, the frame to include a loop timing message that includes a control, length, and value (TLV) information string with message type bits set to indicate the slave link partner is a timing slave; and in response to an acknowledge message received from the master link partner, activate loop timing with the slave link partner as the timing slave.

In one example, if a response is not received from the master link partner within a selected time, activate loop timing with the slave link partner as the timing slave. In one example, in response to a denial message received from the master link partner, loop timing is not enabled with the slave link partner.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, data, or a combination. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine-readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals, or both, to prepare the communication interface to provide a data signal describing the software content. The communication interface can be accessed via one or more commands or signals sent to the communication interface.

Aspects of the embodiments herein can be implemented in a rack scale system. The rack scale system is a disaggregated architecture in which separate resource pools can be interconnected or "composed", on demand into logical systems or "nodes" optimized for specific applications. When a composed node is no longer needed, its resources can be released back to the resource pools for use by another workload.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. An apparatus comprising:
port circuitry in a slave link partner, to communicate with a master link partner, the port circuitry including:
a transmit clock having a transmit clock frequency; and
a loop timing controller in a physical coding sublayer (PCS) module, the loop timing controller configured to receive a recovered receive clock from the master link partner and to initialize loop timing with the master link partner to adjust the transmit clock frequency so that a receive clock frequency of the recovered receive clock from the master link partner is equal to the transmit clock frequency.

2. The apparatus of claim 1, wherein the master link partner is selected to be a timing slave.

3. The apparatus of claim 1, wherein the loop timing is initialized through use of a loop timing ordered set.

4. The apparatus of claim 1, wherein if both the slave link partner and the master link partner are capable of loop timing, symmetry breaking to be performed to determine if the slave link partner or the master link partner is designated a Slave.

5. The apparatus of claim 1, wherein the loop timing is deactivated in the slave link partner upon detection that the master link partner is configured to perform the loop timing.

6. The apparatus of claim 1, wherein the transmit clock frequency is adjusted prior to transfer of data between the slave link partner and the master link partner.

7. The apparatus of claim 1, wherein if the slave link partner is capable of loop timing, the slave link partner is designated a slave.

8. A system comprising:
a memory module, the memory module comprising at least one volatile memory integrated circuit, the volatile memory integrated circuit to store a message; and
port circuitry in a slave link partner, to send the message stored in the volatile memory integrated circuit to a master link partner, the port circuitry including:
a transmit clock having a transmit clock frequency; and
a loop timing controller in a physical coding sublayer (PCS) module, the loop timing controller configured to receive a recovered receive clock from the master link partner and to initialize loop timing with the master link partner to adjust the transmit clock frequency so that a receive clock frequency of the recovered receive clock from the master link partner is equal to the transmit clock frequency.

9. An apparatus comprising:
a transmit clock having a transmit clock frequency; and
a loop timing controller in a physical coding sublayer (PCS) module, the loop timing controller configured to adjust the transmit clock frequency to be equal to a receive clock frequency of a recovered receive clock for a PHY.

10. A system comprising:
a slave link partner;

port circuitry in the slave link partner, to communicate via a copper cable with a master link partner, the port circuitry including:
- a transmit clock having a transmit clock frequency; and
- a loop timing controller in a physical coding sublayer (PCS) module, the loop timing controller configured to receive a recovered receive clock from the master link partner and to initialize loop timing with the master link partner to adjust the transmit clock frequency so that a receive clock frequency of the recovered receive clock from the master link partner is equal to the transmit clock frequency.

11. The system of claim 10, wherein the master link partner is selected to be a timing Slave.

12. The system of claim 10, wherein the loop timing is initialized through use of a loop timing ordered set.

13. The system of claim 10, wherein if both the slave link partner and the master link partner are capable of loop timing, symmetry breaking to be performed to determine if the slave link partner or the master link partner is designated a Slave.

14. The system of claim 10, wherein the loop timing is deactivated in the slave link partner upon detection that the master link partner is configured to perform the loop timing.

15. The system of claim 10, wherein if the slave link partner is capable of the loop timing, the slave link partner is designated a slave.

16. A method comprising:
- communicating by port circuitry in a slave link partner with a master link partner;
- receiving a recovered receive clock from the master link partner; and
- initializing loop timing, by a loop timing controller in a physical coding sublayer (PCS) module, with the master link partner to adjust a transmit clock frequency so that a receive clock frequency of the recovered receive clock from the master link partner is equal to the transmit clock frequency.

17. The method of claim 16, wherein if both the slave link partner and the master link partner are capable of the loop timing, symmetry breaking to be performed to determine if the slave link partner or the master link partner is designated a Slave.

18. The method of claim 16, wherein the master link partner is selected to be a timing slave.

19. The method of claim 16, wherein the loop timing is initialized through use of a loop timing ordered set.

20. The method of claim 16, wherein if the slave link partner is capable of the loop timing, the slave link partner is designated a slave.

21. The method of claim 16, wherein the loop timing is deactivated in the slave link partner upon detection that the master link partner is configured to perform the loop timing.

22. A computer-readable non-transitory medium for storing machine-executable instructions that, cause a system to:
- send, from a slave link partner, a Link-Layer Discovery Protocol (LLDP) frame to a master link partner, the frame to include a loop timing message that includes a control, length, and value (TLV) information string with message type bits set to indicate the slave link partner is a timing slave; and
- in response to an acknowledge message received from the master link partner, activate loop timing in a physical coding sublayer (PCS) module with the slave link partner as the timing slave.

23. The computer-readable non-transitory medium of claim 22, further comprising:
- if a response is not received from the master link partner within a selected time, activate loop timing with the slave link partner as the timing slave.

24. The computer-readable non-transitory medium of claim 22, further comprising:
- in response to a denial message received from the master link partner, loop timing is not enabled with the slave link partner.

\* \* \* \* \*